(12) United States Patent
Sugita et al.

(10) Patent No.: US 7,142,974 B2
(45) Date of Patent: Nov. 28, 2006

(54) ENGINE MEASURING EQUIPMENT

(75) Inventors: Mitsuharu Sugita, Kitamoto (JP);
Keniti Kondo, Kitamoto (JP); Hikaru Furukawa, Kitamoto (JP)

(73) Assignee: A&D Company, Limited, Tokyo (JP)

( * ) Notice: Subject to any disclaimer, the term of this patent is extended or adjusted under 35 U.S.C. 154(b) by 0 days.

(21) Appl. No.: 11/092,757

(22) Filed: Mar. 30, 2005

(65) Prior Publication Data

US 2006/0106526 A1 May 18, 2006

(30) Foreign Application Priority Data

Nov. 16, 2004 (JP) .............................. 2004-332471

(51) Int. Cl.
*G06F 19/00* (2006.01)

(52) U.S. Cl. .................. 701/114; 324/379; 702/33; 702/124; 702/182

(58) Field of Classification Search ................ 701/114; 324/379; 702/33, 41, 44, 85, 79, 94, 105–115, 702/124, 150, 151, 176, 178, 189, 182–184
See application file for complete search history.

(56) References Cited

U.S. PATENT DOCUMENTS

| | | | | |
|---|---|---|---|---|
| 4,303,370 A | * | 12/1981 | Kuwabara et al. | 415/17 |
| 4,653,274 A | * | 3/1987 | David | 60/595 |
| 5,515,272 A | * | 5/1996 | Sakai et al. | 70/129 |
| 5,529,043 A | * | 6/1996 | Nagaishi et al. | 123/478 |
| 5,748,474 A | * | 5/1998 | Masuda et al. | 701/90 |
| 5,832,400 A | * | 11/1998 | Takahashi et al. | 701/53 |
| 6,018,694 A | * | 1/2000 | Egami et al. | 701/102 |
| 6,470,252 B1 | * | 10/2002 | Tashiro et al. | 701/51 |
| 2001/0056318 A1 | * | 12/2001 | Tashiro et al. | 701/48 |
| 2005/0027402 A1 | * | 2/2005 | Koibuchi | 701/1 |

FOREIGN PATENT DOCUMENTS

| | | |
|---|---|---|
| JP | 2005-090353 | 4/2005 |
| JP | 2005-194977 | 7/2005 |
| JP | 2005-195543 | 7/2005 |
| JP | 2005-195544 | 7/2005 |
| JP | 2005-199542 | 7/2005 |

* cited by examiner

*Primary Examiner*—John T. Kwon
(74) *Attorney, Agent, or Firm*—Eric J. Robinson; Robinson Intellectual Property Law Office, P.C.

(57) ABSTRACT

Engine measuring equipment for obtaining engine torque regarded as necessary for engine performance assessments for a short time period during a period when engine revolution is under a transient state is disclosed. The engine measuring equipment includes a central control unit for controlling throttle opening degrees due to revolution of the engine and load torque of the dynamometer; a detector connected to an output shaft of the engine, for detecting measurement data including at least revolution and shaft torque of the engine driven by controlling the central control unit; and a signal processing unit for measuring engine torque based on measurement data from the detector. The signal processing unit operates so as to calculate the engine torque based on time series data of the revolution and the shaft torque detected with the detector to measure engine torque from transient state data.

5 Claims, 13 Drawing Sheets

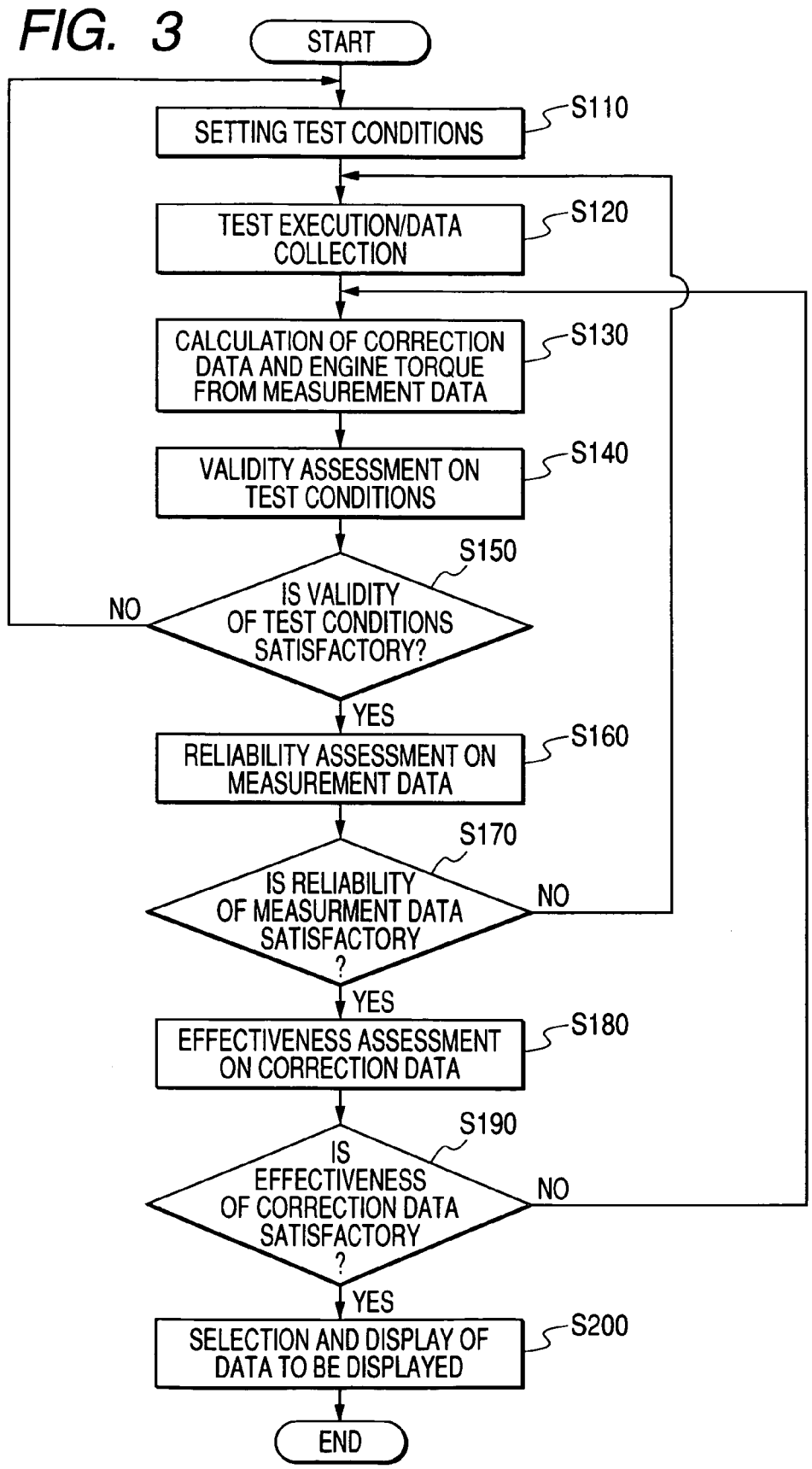

SHAFT TORQUE TD

AVERAGE SHAFT TORQUE TDAVG

REVOLUTION N

THROTTLE OPENING DEGREE S

FIG.5(a)
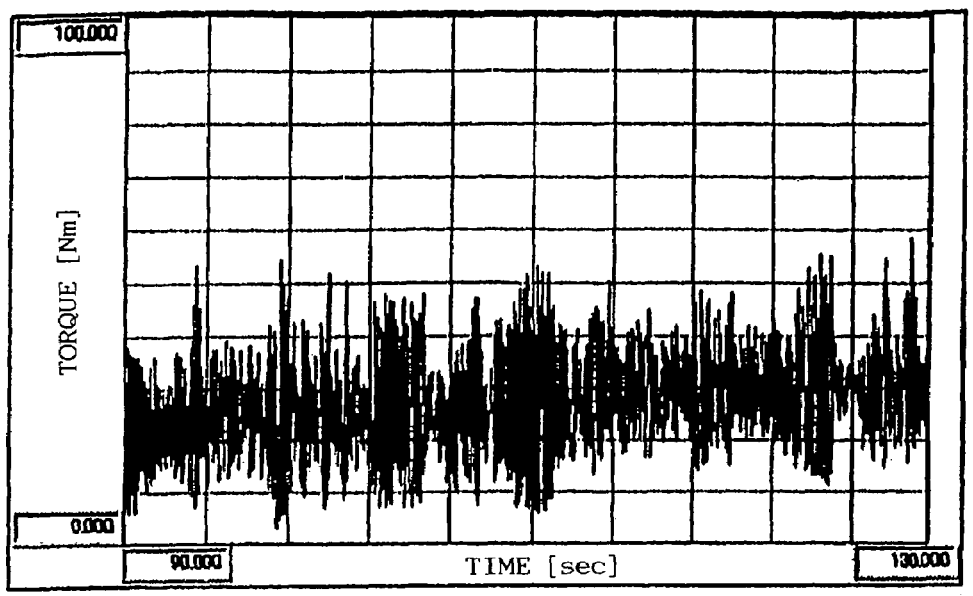
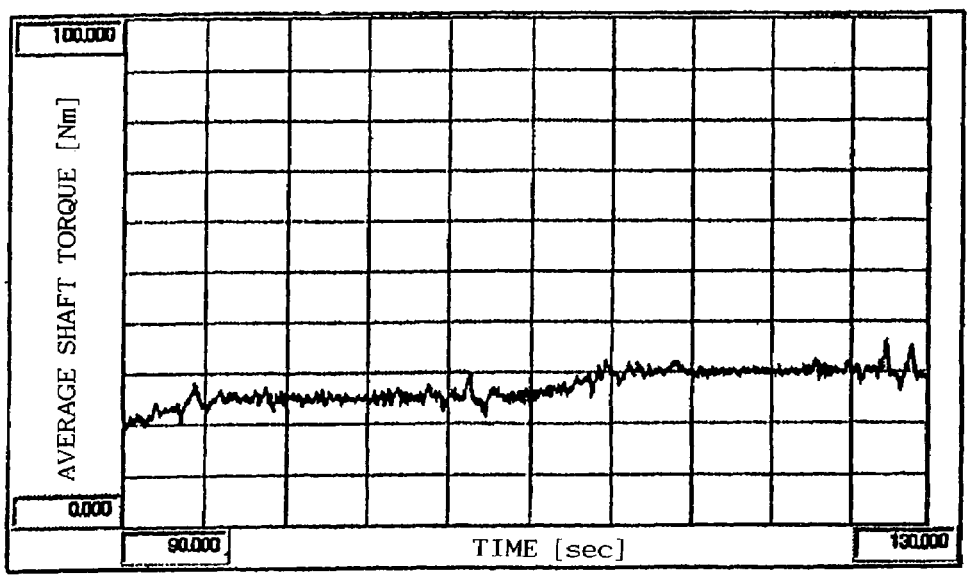
FIG.5(b)

FIG. 5(c)
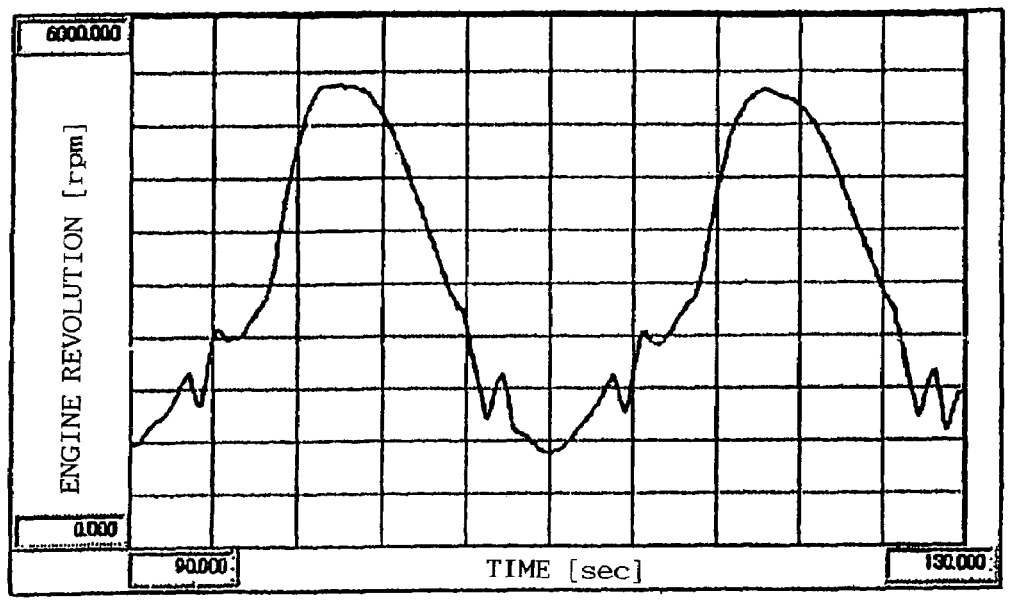
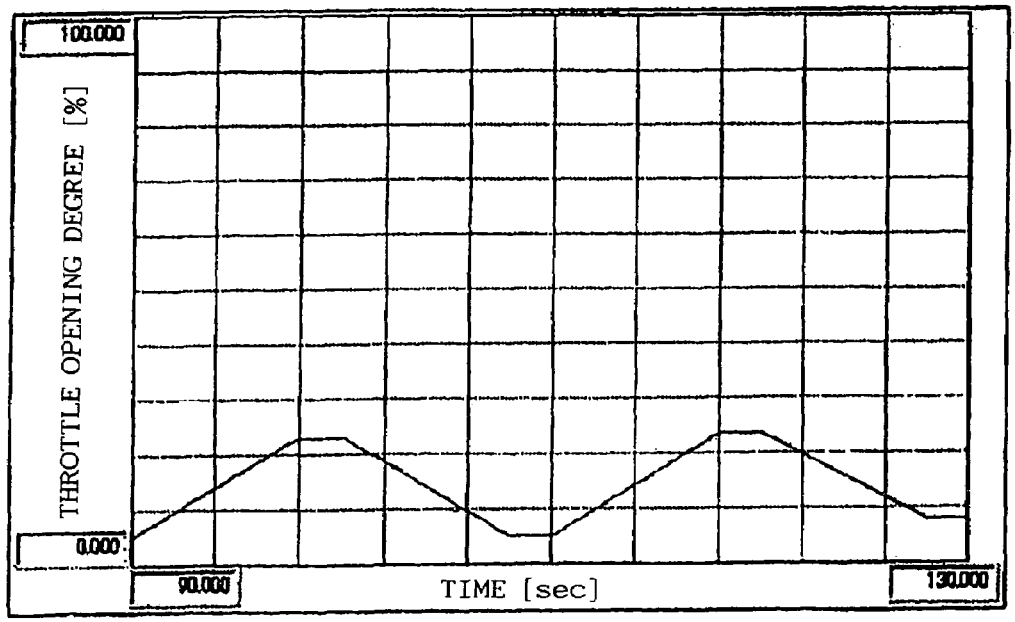
FIG. 5(d)

ENGINE MEASURING EQUIPMENT

BACKGROUND OF THE INVENTION

1. Field of the Invention

The present invention relates to engine measuring equipment.

2. Related Background Art

Conventionally, in order to assess whether a developed or manufactured engine is provided with the predetermined performance, engine bench tests are implemented in which an engine to be tested is mounted on a bench (an engine bench), the engine output shaft is brought into connection, through a torque meter as well as a rotation counter, with a dynamometer, which is operated to measure and assess the performance of a stand-alone engine.

For such engine bench tests, various techniques have been researched and developed. For example, Japanese Patent Application Laid-Open No. 02-196942 discloses a testing device for engines which aims to improve responsiveness and controlling accuracy for an automatic revolving speed control (ASR) system and automatic load control (ATR) system by suppressing a change of revolving speed by detecting the change of load by the ASR system. Japanese Patent Application Laid-Open No.02-226036 discloses a controlling apparatus for engine testing technique which aims to achieve control of a high-speed response with high accuracy by detecting the running condition of an engine, operating a controlling constant of an engine controlling part in accordance with the running condition and outputting said controlling constant to the engine controlling part. Japanese Patent Application Laid-Open No.03-075539 discloses an engine testing apparatus which aims to enhance the efficiency of the test of an engine and to make it possible to realize highly accurate engine test by providing means for computing the changing coefficient of engine torque, means for computing the correcting amount of opening degree and means for correcting the opening degree. Japanese Patent Application Laid-Open No.2002-082020 discloses an engine torque estimating device of engine bench system which aims solve a problem that when an engine torque map is used in an engine bench system, an error of an engine torque estimated value affects a torque command value of a dynamo meter to disturb accurate engine benching. Japanese Patent Application Laid-Open No.2004-177259 discloses a controller for engine tester which aims to solve a problem in an engine tester for simulating a load by using a controller having a vehicle model part and a torque control part, that an unstable phenomenon appears in engine speed when a response is slow in a closed loop of a shaft torque control system relative to a closed loop of the model part.

Engine bench tests which are regarded most important for the engine performance assessment are to measure the relationship between the engine torque Te and the revolution N. However, engine bench tests provide torque measured with a torque meter (hereinafter referred to as shaft torque Td) which is different from engine torque Te as an output parameter representing pure engine performance, and therefore, from the shaft torque Td measurable with engine bench tests, the engine torque Te necessary for assessing the original performance of an engine need to be obtained.

Engine torque Te and shaft torque Td are corelated under $Te=Td-I\times dN/dt$ (I: moment of inertia of a rotating shaft including an engine, the transmission system from the engine to a dynamometer and the dynamometer). Therefore, conventional engine test equipment measured the shaft torque Td, which used to be regarded as engine torque Te, under a state with the revolution N made constant as described in Japanese Patent Application Laid-Open No. 2000-321175, that is, the state with $dN/dt$ approximated to 0. Incidentally, a test method of measuring torque under a state with the revolution N made static (a steady state) like this is generally called a steady-state test.

However, such engine test equipment had technical problems described as follows.

The engine test equipment disclosed in Japanese Patent Application Laid-Open No. 2000-321175 needs to vary opening degrees of the throttle bulb under a state with revolution N made constant as described above, and, however, not only the revolution N but also most physical phenomena, generally make transition to a static state via a transient state (a state with values not stabilized at a constant value so as to repeat swinging). Accordingly, it take as much as several tens of seconds for the revolution N to get settled to a static state, and eventually it used to take a period of several days to obtain the revolution as well as the torque data for each opening degree required for engine performance assessments.

Moreover, since items required for the holistic assessment of engine performance is not limited hereto, but hundreds of items complete a test, measurement data are desirably to be obtained as much as possible even for a single item.

The present invention has been completed in view of such conventional problems, and it is an objective to provide engine measuring equipment for obtaining engine torque Te regarded as necessary for engine performance assessments for a short time period during a period when the revolution N is under a transient state, without depending on a conventional steady-state test method.

SUMMARY OF THE INVENTION

In order to attain the above objective, the engine measuring equipment according to the present invention is configured so that, in the engine measuring equipment for measuring engine performance in bench tests implemented with an engine and a dynamometer connected to the engine, the engine measuring equipment comprises a central control unit for controlling throttle opening degrees due to revolution of the engine and load torque of the dynamometer; a detector connected to an output shaft of the engine, for detecting measurement data including at least revolution and shaft torque of the engine driven by controlling the central control unit; and a signal processing unit for measuring engine torque based on measurement data from the detector. And, the central control unit implements such controlling that the revolution is lead to a transient state and the shaft torque varies during a period of the transient state; and the signal processing unit calculates the engine torque based on time series data of the revolution and the shaft torque detected with the detector to measure engine torque, from transient state data.

More in particular, by implementing computing process inclusive of bringing time series data of the revolution and/or the shaft torque into time differentiation, the engine torque has been calculated.

According to such configured engine measuring equipment, engine torque is measured with measurement data under a transient state (transient data) without waiting for the revolution getting settled to a static state, so that, comparing with a conventional steady-state test, the time period to calculate engine torque is shortened by a large margin.

In addition, the central control unit may increase or decrease the load torque sequentially at each predetermined value so as to control, at the same time, the throttle opening degrees to swing for at least one cycle from the minimum value to the maximum value at each step of the predetermined value.

This configuration will make load torque to provide with the step waveform to swing the throttle opening degrees at each stage from the minimum value to the maximum value so as to make various combination of shaft torque and revolution data set in shorter time period, thus contributing for shortening time to calculate engine torque.

In addition, the engine measuring equipment may further have a display unit for displaying characteristics of relationship between the engine torque and the revolution N.

This configuration will make performance of an engine understandable visually at a glance.

In addition, the engine measuring equipment may further have an assessing portion for implementing validity assessment on the test conditions and/or reliability assessment on the measurement data and/or effectiveness assessment on the correction data as well as engine torque calculated based on the measurement data.

Implementation of such assessment will secure reliability of engine performance data obtainable based on the measurement data under a transient state on revolution so that instead of conventional steady-state tests, engine measuring equipment of the present invention obtaining engine torque from the transient data in a short period will be proposed.

BRIEF DESCRIPTION OF THE DRAWINGS

FIG. 3 is a flow chart showing the holistic operation of the engine measuring equipment;

FIG. 5(A) to FIG. 5(D) are graphs showing enlarged graphs in FIG. 4 for the periods of 90 seconds to 130 seconds;

DESCRIPTION OF THE PREFERRED EMBODIMENTS

Figure 1:
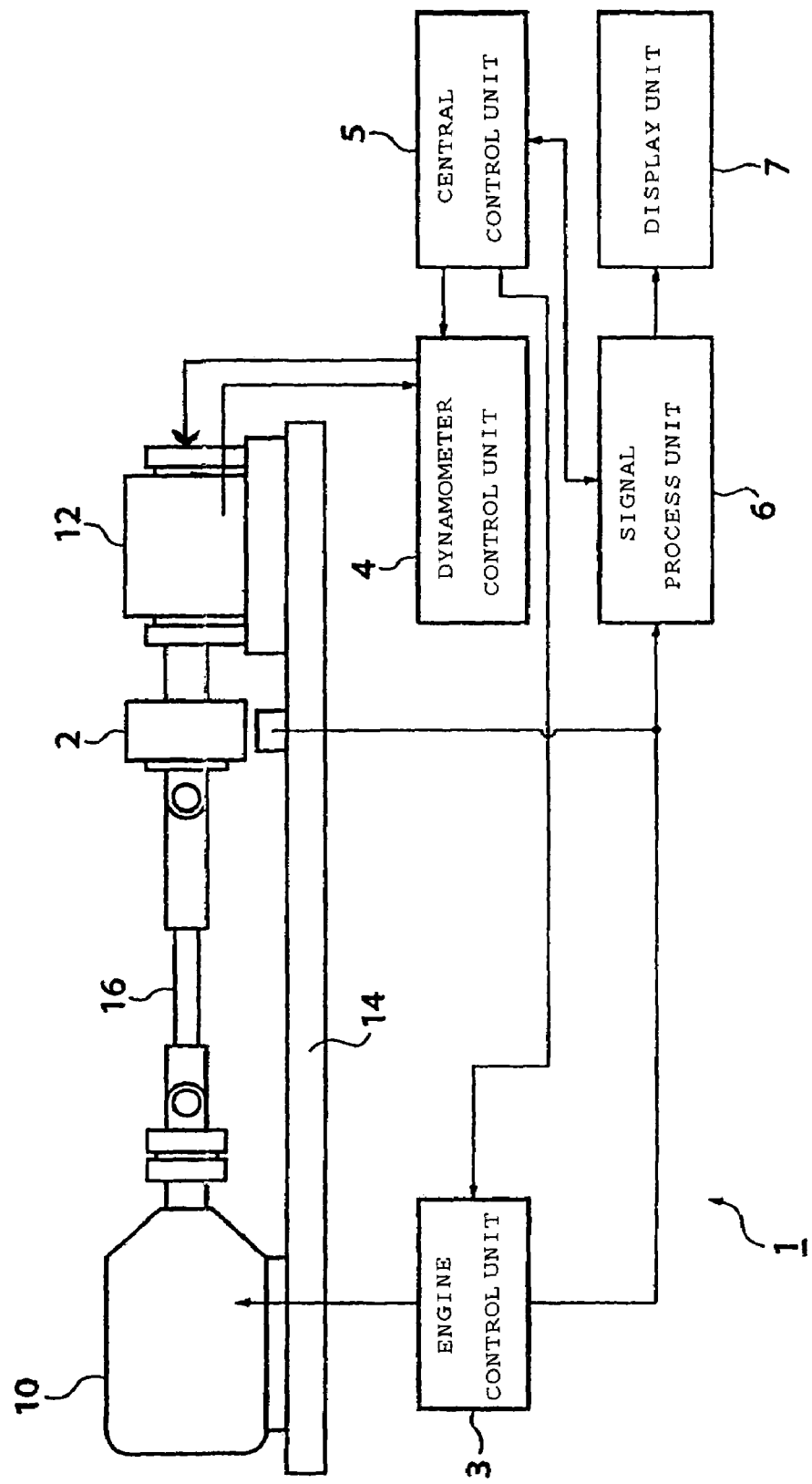
FIG. 1 is a block diagram showing a schematic connection configuration of engine measuring equipment.

Preferable embodiments of the present invention will be described in detail based on the attached drawings as follows. FIG. 1 is a block diagram showing a schematic connection configuration of engine measuring equipment of the present invention, and engine measuring equipment 1 comprises an engine 10 being an object to be tested, a dynamometer 12 connected to the engine 10, a bench (an engine bench) 14 to fix the engine 10 and the dynamometer 12 thereon. This engine measuring equipment 1 is used for bench tests to measure and assess performance of a stand-alone engine 10 without real machine units (such as transmission and tires) other than the engine 10 being brought into connection thereto.

In the present embodiment, the output shaft of the engine 10 is connected to an end of a torque transmission shaft 16 via connection means such as a universal joint 16a and the like, the other end of the torque transmission shaft 16 is connected to various kinds of detectors 2 such as a revolution detector and a torque meter and is connected to the dynamometer 12 via the detector 2.

The dynamometer 12 of the present embodiment is made to be able to obtain stable outputs from the detector 2 in accordance with each revolution N even in case of occurrence of rapid variations in revolution N of the engine 10 from low speed rotations to rapid rotations of the maximum ability thereof, constituting a low inertia dynamometer. The low inertia dynamometer can set the load torque with varying current and voltage as described later so as to enable detection of pure torque accompanied by rotation of the engine 10.

In the present embodiment, torque is detected with the detector 2 intervening between the torque transmission shaft 16 and the dynamometer 12, but torque can be detected from outputs of the dynamometer 12. In addition, to the torque transmission shaft 16 a clutch, a transmission and various connection means and the like may be inserted in accordance with purposes of bench tests.

Moreover, the engine measuring equipment 1 comprises an engine control portion 3, a dynamometer control portion 4, a central control unit 5, a signal processing unit 6 and a display portion 7.

The engine control portion 3, which is connected to the engine 10, is means for controlling the throttle opening degree S of the engine 10. The engine control portion 3 provides the engine 10 with a predetermined throttle opening degree S so as to bring the engine 10 into rotation, which is transmitted to the dynamometer 12 via the transmission shaft 16. That is, the revolution N of the engine 10 is to be controlled by controlling the throttle opening degree S.

Precisely, the revolution N varies due to various causes such as fuel injection quantity, air injection quantity, fuel-air ratio and moreover ignition time in case of a gasoline engine and fuel injection control method in case of a diesel engine besides the throttle opening degree S, but an object of the present embodiment is to obtain the engine torque Te at each throttle opening degree S and each revolution N, and effects of the various causes onto the engine torque Te are considered tiny and detailed description will be omitted in the present specification.

The dynamometer control portion 4, which is connected to the dynamometer 12, is means to control by varying currents and voltage applied to the dynamometer 12. Controlling by varying currents and voltage of the dynamometer 12, the load torque of the engine 10 connected to the dynamometer 12 is controlled. The dynamometer 12 used in the present embodiment is a low inertia dynamometer, featuring the load torque detected by the dynamometer 12 and the shaft torque Td detected by the detector 2 being substantially the same, and therefore the load torque will be considered synonymous with the shaft torque Td.

The central control unit 5 is means for controlling the engine control portion 3, controlling the dynamometer control portion 4, the later described signal processing unit 6 and the display portion 7. The central control unit 5 may, for example, operate based on instruction from a not-shown operation input portion.

The central control unit 5 of the present embodiment controls the engine control portion 3 and the dynamometer control portion 4 so that time series data of the revolution N under a transient state not getting stabilized at a constant value and time series data of the shaft torque Td varying during the period of this transient state can be measured from the detector 2.

In particular, the central control unit 5 gives a plurality rounds of orders to vary currents and voltage to the dynamometer control portion 4, each round being implemented one after another, thus the dynamometer control portion 4 varies the load torque of the engine 10. A plurality of rounds of varying current and voltage mean, for example, that the load torque increases or decreases sequentially at each predetermined value and are equivalent to the load torque providing with a plurality of step waveforms.

Moreover, the central control unit 5 gives to the engine control portion 3 such an order to swing the throttle opening degrees S for at least a single round from the minimum value to the maximum value (for example from 0% to 100%) at each step of the predetermined value of the load torque of the dynamometer 12 (for example, at each step in case of the load torque shaped a plurality of step waveforms), and thereby controls these dynamometer 12 and engine 10 to rotate the engine 10. Since the revolution N varies in accordance with quantity of the throttle opening degree S, the throttle opening degree S is varied from 0% to 100% so as to vary the revolution N as well from 0 to the revolution with the maximum speed of the engine 10.

In other words, the central control unit 5 increases or decreases the load torque of the dynamometer 12 sequentially at each predetermined value so as to, at the same time, swing the throttle opening degrees for at least a single cycle from the minimum value to the maximum value at each step of the predetermined value.

The central control unit 5 implements engine control as well as dynamometer control as described above to drive the engine 10 with the revolution N swinging from the minimum value to the maximum value to vary the load torque stepwise under a transient state not getting stabilized at a constant value. This will make obtainable from the detector 2 various combination of data sets of the revolution N, the shaft torque Td and the throttle opening degree S during successive short time periods.

Figure 2:
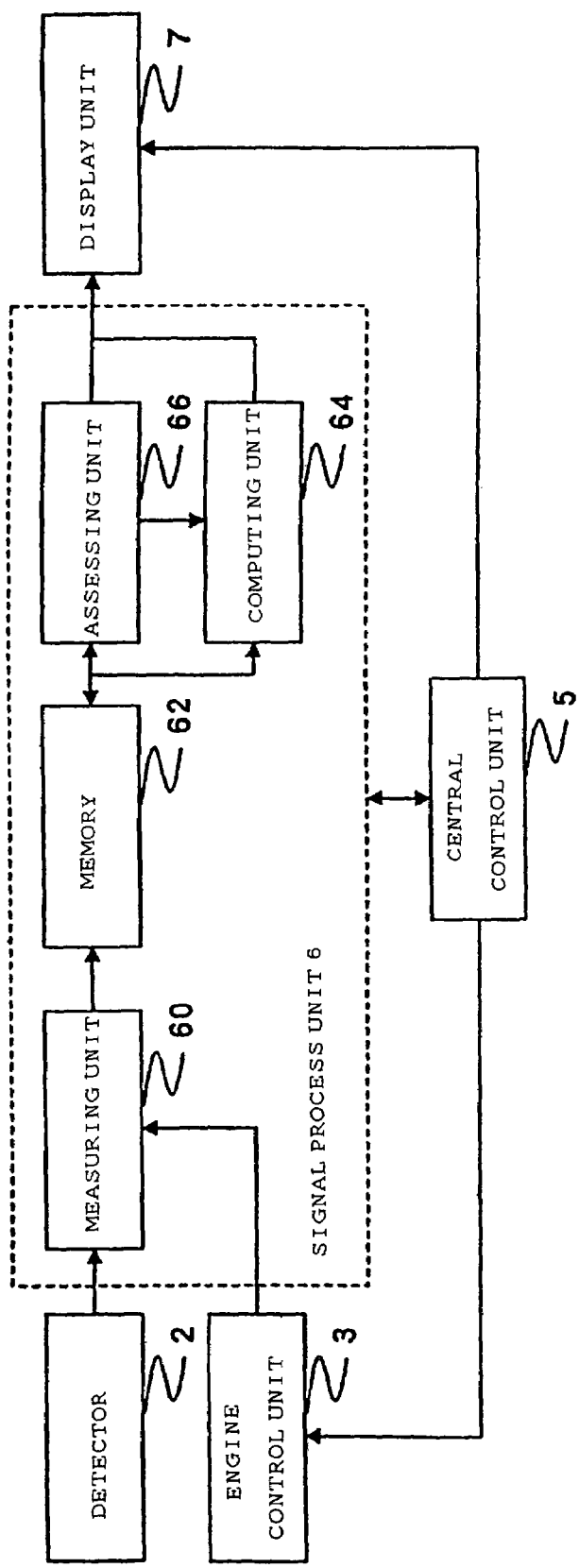
FIG. 2 is a block diagram showing a signal processing unit.

The signal processing unit 6 comprises in detail as shown in FIG. 2 a measuring portion 60, a memory 62, a computing portion 64 and an assessing portion 66 and operates based on instructions of the central control unit 5. Incidentally, the control portion for controlling the signal processing unit 6 and the display portion 7 may be prepared separately besides the central control unit 5 for controlling the engine control portion 3 and the dynamometer control portion 4.

The measuring portion 60 is means for measuring and inputting the measurement data obtained from the detector 2 while the central control unit 5 is controlling the engine control portion 3 and the dynamometer control portion 4 so that tests are implemented under test conditions predetermined in advance, that is, the transient data of the revolution N, the time series data of the shaft torque Td varying during the period of the transient data and the time series data of the throttle opening degree S provided from the engine control portion 3 to the engine 10 during the same period. The time series data of the throttle opening degree S may be inputted not from the engine control portion 3 but directly from the central control unit 5 or may be inputted from a throttle opening degree detector and the like equipped in the engine 10.

The measurement data, in case of analog signal, are converted into digital signals since the measuring portion 60 comprises an A/D converter. In the case where the measurement data are in digital signal, no A/D converter is required, but in any event, a plurality of measurement data inputted are required to be brought into chronological synchronization each other for the purpose of processing in the computing portion 64.

The memory 62 is means for temporally storing the measurement data inputted to the measuring portion 60 and the computed data in the later-described computing portion 64.

The computing portion 64 is means for implementing various computations based on the data stored in the memory 62. The computing portion 64 includes known computing portions such as a denoising unit (a filter) for data denoising, an adding-subtracting-multiplicating-dividing unit, a differentiating-integrating unit, an average value computing unit, a standard deviation computing unit, a counting unit (counter) on data frequency and the like and frequency analyzing unit (FFT).

The computing portion 64 of the present embodiment is means for obtaining engine torque Te from time series data under the transient state of the measured revolution N and the shaft torque Td, and in detail is means for obtaining corrected data of the engine torque Te ($=I \times dN/dt$, I: inertia moment of the rotation shaft including the engine 10, the transmission system from the engine 10 to the dynamometer 12 and the dynamometer 12) based on the time series data of the measured revolution N and moreover for implementing subtraction between the shaft torque Td and the corrected data every same time period of the time series data to obtain the engine torque Te ($=Td-I \times dN/dt$).

Originally, the engine torque Te as output parameter expressing performance of a pure stand-alone engine is, as clarified from the above equation, approximated to $dN/dt=0$, that is, the shaft torque Td under a static state where the revolution N is stable at a constant value. Accordingly, conventionally, the engine torque Te used to be obtained by measuring the shaft torque Td under the static state in case of bench tests with the dynamometer 12.

Moreover, not depending on bench tests or in-vehicle tests, an engine test normally starts with the revolution N being 0, and therefore, it takes several tens of seconds until the revolution N gets settled to a static state via a transient state, requiring a period as much as two to three days to obtain the engine torque Te for each revolution N and each throttle opening degree S.

However, the engine measuring equipment 1 of the present invention does not wait for the revolution N to get settled to a static state, but nevertheless implements time differentiation on the revolution N with measurement data (transient data) under the transient state not keeping at a constant state to be multiplied by the inertia moment I so as to obtain correction data, which correction data is brought into subtraction from the shaft torque Td in the same time period, and therefore shortens computing period of the engine torque Te by a large margin compared with prior arts.

The central control unit 5 needs to feed the shaft Td and the revolution N detected from the detector 2 back so as to control the engine control portion 3 and the dynamometer control portion 4 in order to implement tests under set test conditions, and therefore the computing portion 64 also has functions of computing, based on the signals inputted from the measuring portion 60, the controlling signals to the engine control portion 3 and the dynamometer control portion 4 to send the controlling signals to the central control unit 5 (computing function for feedback control). However, computation for the feedback control is not necessarily implemented in the signal processing unit 6, but the output from the detector 2 may be inputted directly to the central control unit 5 so as to implement computation for the feedback control in the central control unit 5.

The assessing portion 66 is means for assessing, based on the data stored in the memory 62 or based on the data computed in the computing portion 64 whether the test conditions determined in advance, the measurement data detected from the detector 2, the correction data computed in the computing portion 64 and the engine torque Te is effective or valid.

Assessing in the assessing portion 66 will secure reliability of engine performance obtainable based on the measurement data under the transient state of the revolution N, thereby will propose the engine measuring equipment 1 of the present invention that obtains engine torque Te from transient data in a short period instead of prior art static tests.

The display portion 7 is means for displaying measurement data, computation results and assessment results in the assessing portion 66. In particular, the display portion 7 can display not only respective measurement data as well as the computation results in the computing portion 64 but also graphs on relationship among a plurality of data, traces, frequency distribution tables and standard deviation graphs and the like among a plurality of data. Of course the measurement data and the computation results in the computing portion 64 can be displayed on the same screen in combination if they come out in the same time period.

In the display portion 7, displaying the characteristic relationship between the engine torque Te and the revolution N for example with the throttle opening degree S being as parameter on a graph, basic performance of the engine 10 will become visually understandable at a glance. In addition, also in case of displaying the assessment results in the assessing portion 66, it will likewise become readily understandable whether the test conditions, the measurement data and the correction data are effective or valid.

EMBODIMENTS

The holistic operation of engine measuring equipment 1 will be described as follows with reference to the flow chart of FIG. 3. An object of engine measuring equipment 1 of the present embodiment is to obtain the relationship between the engine torque Te and the revolution N for each throttle opening degree S, which is regarded most basic and important among indexes for assessing performance of an engine 10 being a test object.

At first, the engine measuring equipment 1 sets test conditions (S110). The test conditions for the present embodiment should include application of current and voltage from the dynamometer control portion 4 to the dynamometer 12 so as to provide load torque of the dynamometer 12 in stepwise waveform of approximately 5 Nm unit in series from 5 Nm to 70 Nm. The lasting period of a single step should be approximately 20 seconds. The stepwise waveform, which may be arranged upward or downward, had better be arranged upward in order to shorten the test period since downward arrangement must follow maximization of load torque at first.

Moreover, for such a period that the load torque remains at a constant value at each step of the stepwise waveform, the engine control portion 3 is instructed to provide the engine 10 with a throttle opening degree S to swing the throttle opening degree S successively for at least a single cycle from the minimum value of 10% to the maximum value of 50%. Successive swinging is indispensable in order to obtain data from the detector 2 for all throttle opening degrees S without any omissions from the minimum value to the maximum value. In addition, swinging for at least a single cycle is indispensable since the time differentiation value (dN/dt) varies according to whether a specific revolution N is increasing or decreasing. For the present embodiment, the swinging cycle is approximately 0.05 Hz (a single cycle with 20 seconds) and the throttle opening degree S swings for a single cycle at each step.

The swinging waveform of the throttle opening degree S is exemplified by sine waves or triangular waves and the like, and the control method of the central control unit 5 will determine the selection of swinging waveform. Here, exact sine waves or triangular waves are not indispensable but preferable if they are chronologically flat at the minimum and the maximum point of swinging.

In order that a test is implemented under such test conditions that are set as described above and the transient data of the revolution N are obtainable, the central control unit 5 provides the dynamometer control portion 4 and the engine control portion 3 with control signals to drive the engine 10 and the dynamometer 12 so as to implement the test (S120). The central control unit 5 feeds the shaft torque Td and the revolution N detected from the detector 2 back so as to further control the dynamometer control portion 4 and the engine control portion 3 in order to implement tests under set test conditions.

At the same time as to start implementing a test, the measuring portion 60 of the signal processing unit 6 collects time series data of the shaft torque Td and the revolution N from the detector 2 and the throttle opening degree S from the engine control portion 3 respectively and stores them in the memory 62. These time series data should be mutually synchronized for succeeding process in the computing portion 64 and the assessing portion 66. In the case where the measuring portion 60 comprises an AD converter, according to resolution of the AD converter, the data set of shaft torque Td, the revolution N and the throttle opening degree S are stored sequentially in the memory 62.

FIG. 4 to FIG. 7 graph time series data obtained from the detector 2 as well as the engine control portion 3 by implementing tests and inputted to the measuring portion 60; FIG. 4(A) graphing time series data on the shaft torque Td as a result of measurement under the above described test conditions for 300 seconds; FIG. 4(C) graphing time series data on the revolution N measured during the same time as in FIG. 4(A); FIG. 4(D) graphing time series data on the throttle opening degree S measured during the same time as in FIG. 4(A); and FIG. 5(A), FIG. 5(C) and FIG. 5(D) are enlarged graphs of FIG. 4(A), FIG. 4(C) and FIG. 4(D) for a period of 90 seconds to 130 seconds.

Figure 4A:
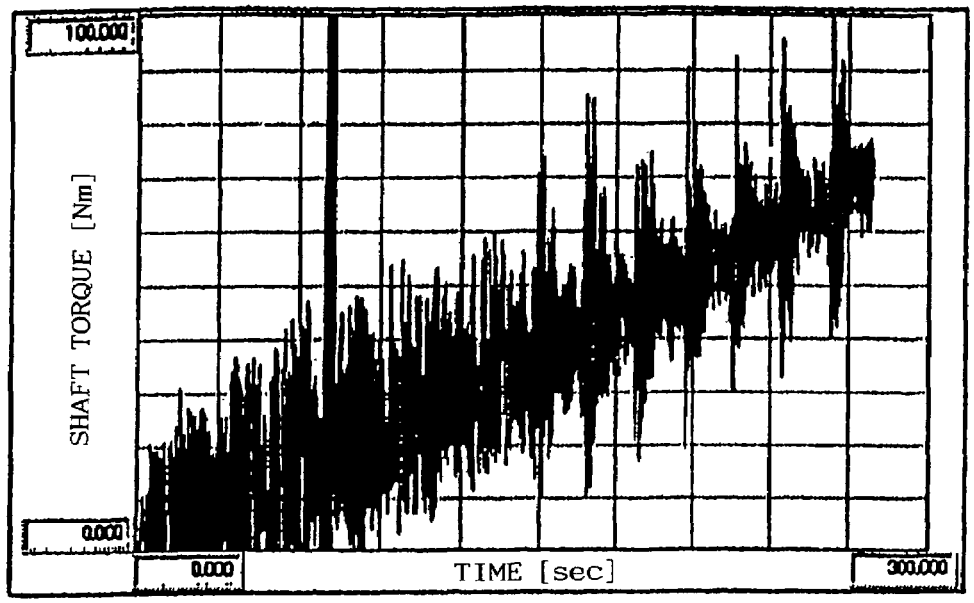
FIG. 4(A) to FIG. 4(D) are graphs showing time series data of shaft torque Td, average shaft torque Tdavg, revolution N, and throttle opening degree S at the time when measurement has been implemented under predetermined test conditions for 300 seconds.
Figure 4B:
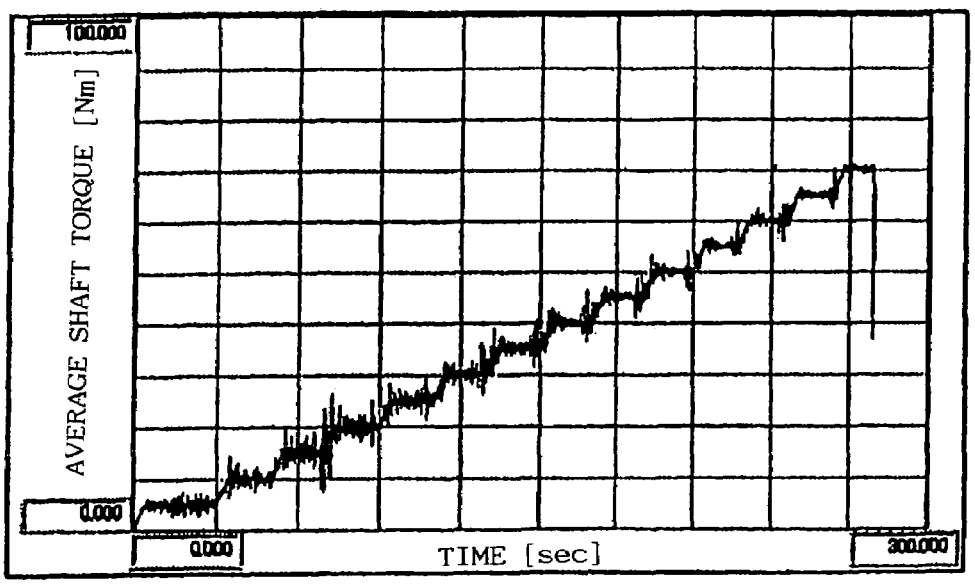

Moreover, FIG. 4(B) graphs moving averages of the shaft torque Td for 100 ms in FIG. 4(A) and FIG. 5(B) is an enlarged graph of the graph of FIG. 4(B) for 90 seconds to 130 seconds. The original data of the shaft torque Td (FIG. 4(A) and FIG. 5(A)) of the present embodiment, as clarified subject to frequency analysis in the computing portion 64, contains signal components of around 25 Hz. These signal components, which are irrelevant to the torque outputted accompanied by driving the engine 10, are regarded as noises due to measuring unit and the like and therefore undergo the moving average process in the computing portion 64 so that the obtained average shaft torque Tdavg will be hereafter regarded as the shaft torque Td and used for treatment.

Figure 4C:
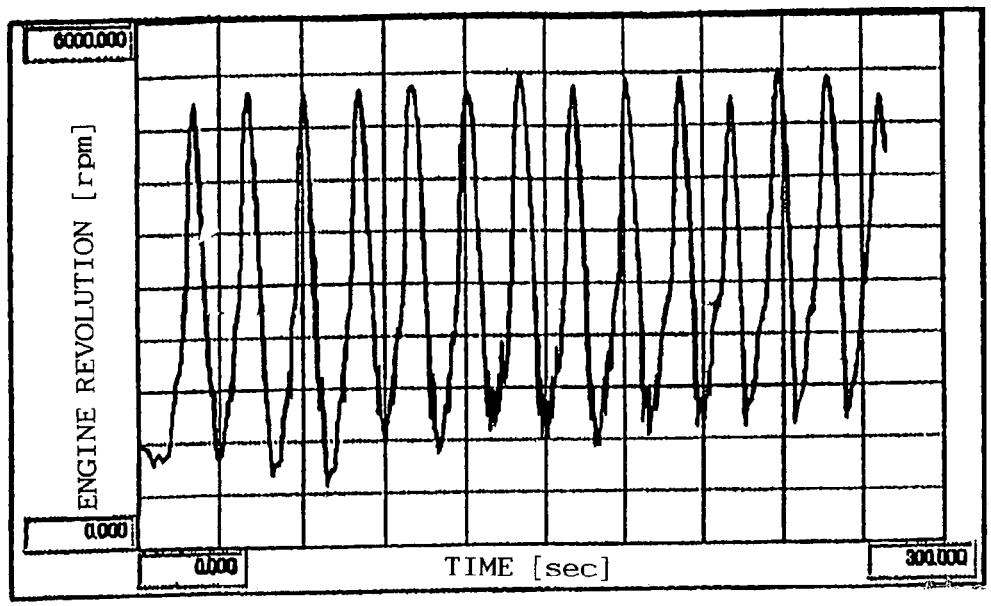
Figure 4D:
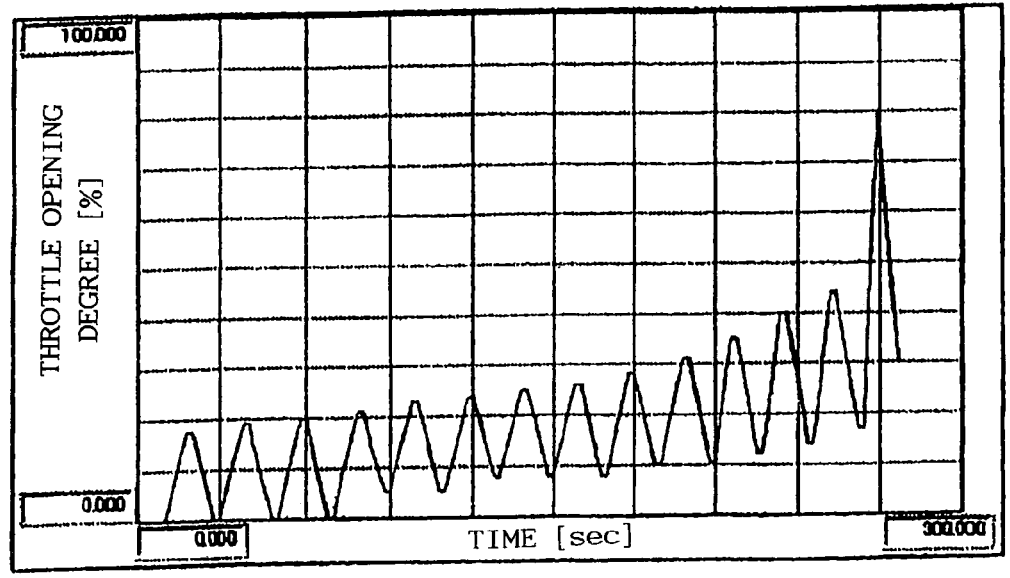
Figure 6:
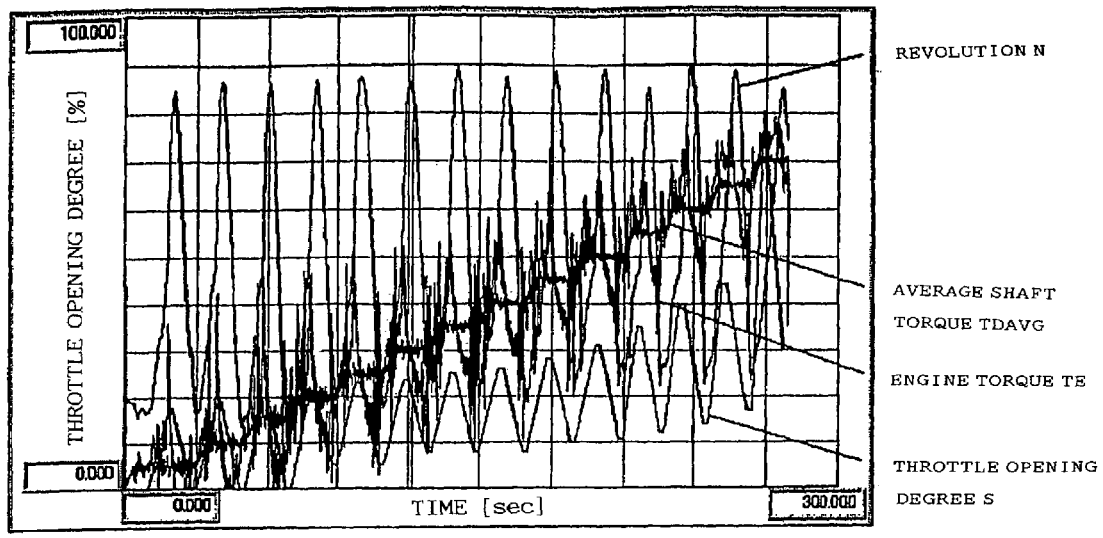
FIG. 6 is a graph comprehensively showing in a single graph the time series data of average shaft torque Tdavg, revolution N, and throttle opening degree S in FIG. 4 as well as the calculated engine torque Te.
Figure 7:
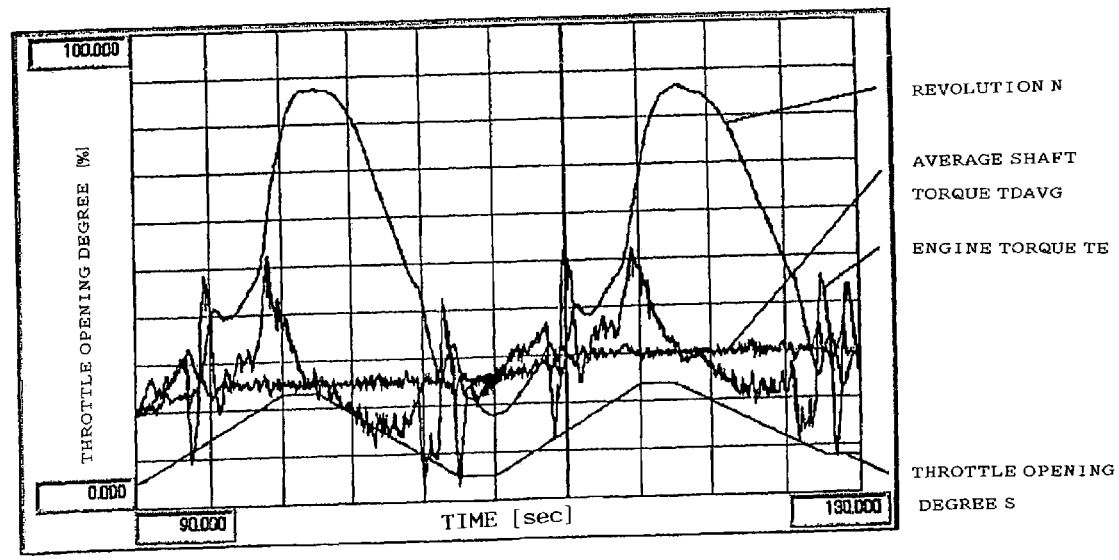
FIG. 7 is a graph showing an enlarged graph in FIG. 6 for the periods of 90 seconds to 130 seconds.

FIG. 6 graphs FIG. 4(B) to FIG. 4(D) on a single screen, and FIG. 7 displays the graph in FIG. 6 further in an enlarged fashion for 90 seconds to 130 seconds.

As a result of test measurement in FIG. 6 and FIG. 7, it is clarified that the shaft torque Td (average shaft torque Tdavg) is shaped a successive upward stepwise waveform during time of 280 seconds and at each step of this stepwise waveform the throttle opening degree S is shaped an approximate triangular waveform for at least a single cycle with a swing from the minimum value to the maximum value, and the throttle opening degree S is chronologically flat at the minimum and the maximum swing (for 2 seconds in the present embodiment). Moreover, in accordance with the waveform of the throttle opening degree S, the revolution N is clarified to be not static data stabilized at a constant value but transient data of an approximate sine waveform.

That is, the present embodiment clarifies that tests have been implemented according to the predetermined test conditions, giving rise to measurement data when the revolution N is under a transient state.

Next, the central control unit 5 instructs the computing portion 64 to calculate corrected data and engine torque Te (S130). Here, as described above, the engine torque Te and the shaft torque Td constitute the relationship of $Te = Td - I \times dN/dt$, and it is known that, under a transient state with the revolution N not stabilized at a constant value, the engine torque Te does not coincide with the shaft torque Td.

Figure 8:
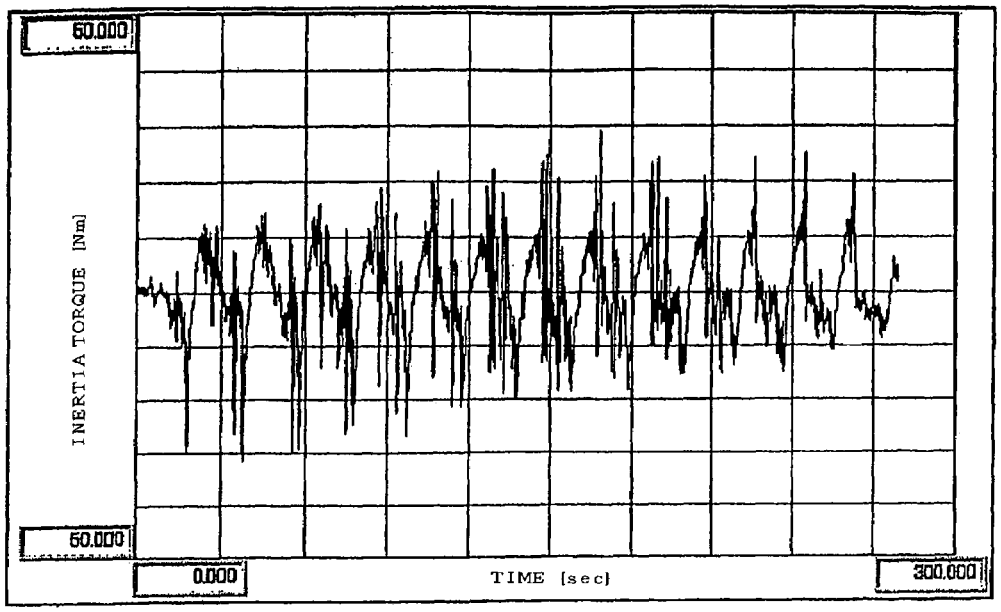
FIG. 8 is a graph showing time series data of correction data.

Under the circumstances, the computing portion 64 executes time differentiation ($dN/dt$) of the time series data of the revolution N among measurement data inputted to the measuring portion 60 to multiply the time differentiation $dN/dt$ by the inertia moment I (0.14 kgm$^2$ in the present embodiment). The time series data of thus obtained correction data are shown in FIG. 8. In FIG. 8, the corrected data are referred to as "inertia torque".

Figure 9:
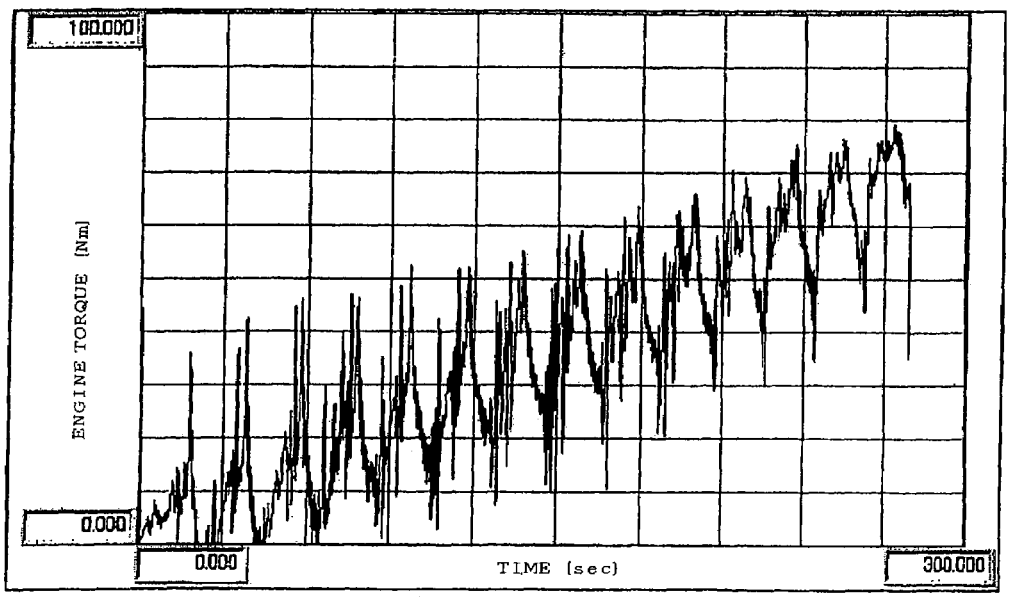
FIG. 9 is a graph showing time series data of engine torque Te.

Moreover, based on the above formula $Te = Td - I \times dN/dt$, the computing portion 64 subtracts time series data of the corrected data in FIG. 8 calculated beforehand from the time series data of the average shaft torque Tadvg shown in FIG. 4(B) every same time period to obtain the time series data of the engine torque Te. The engine torque Te represents the pure torque of the engine 10 under a state where effects onto torque accompanied by variation of revolution N are corrected. FIG. 9 graphs time series data of the calculated engine torque Te.

Thus obtained time series data of the engine torque Te, the time series data of the revolution N and the time series data of the throttle opening degree S are overlapped in every same time period to be shown in the graph in FIG. 6. FIG. 7 is an enlarged graph of FIG. 6 for a period of 90 seconds to 130 seconds.

Figure 10:
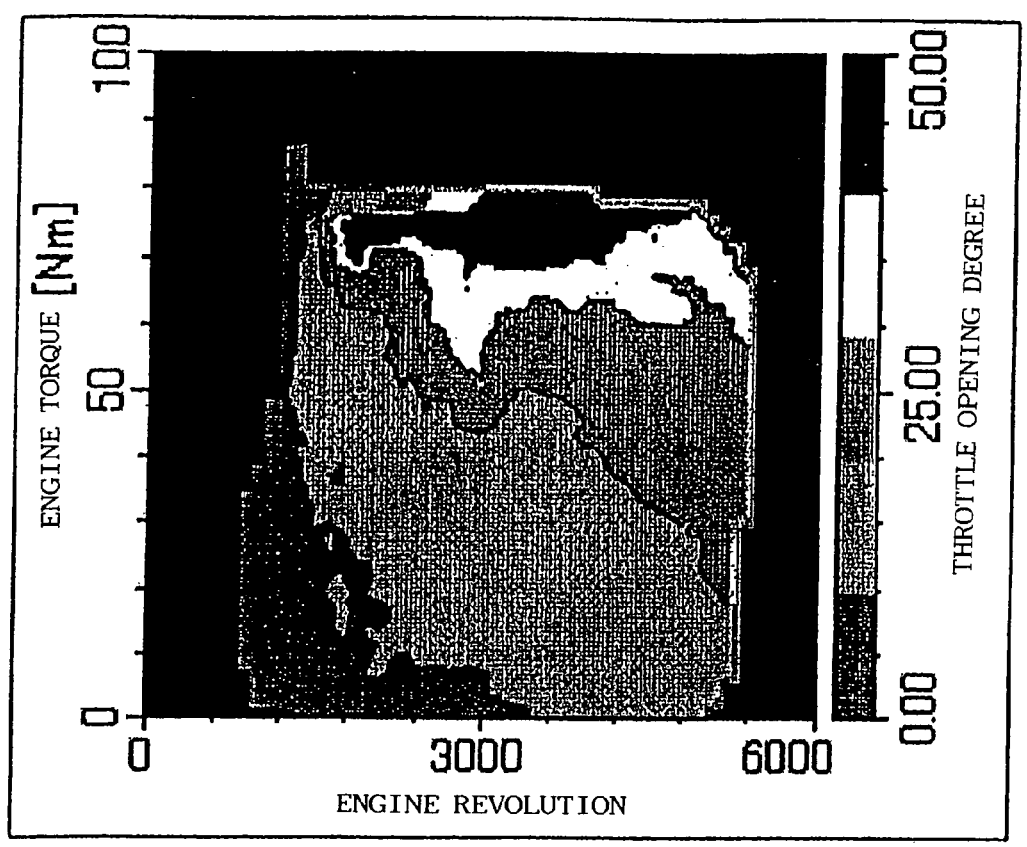
FIG. 10 is a graph showing a plot of engine torque Te at each throttle opening degree S and data of revolution N measured at the same time as the engine torque Te read with throttle opening degree S as parameter.

Here, in order to obtain the characteristic relationship between the engine torque Te and the revolution N, based on the computed results shown in the graph in FIG. 6, with throttle opening degree S as parameter, the displaying portion 7 reads the engine torque Te at each throttle opening degree S and the data of revolution N measured at the same time as the engine torque Te for plotting them on a graph. FIG. 10 shows the results thereof.

Since the throttle opening degree S value as parameter, is as clarified in FIG. 4(D), FIG. 5(D) and FIG. 6, and as clarified from predetermined test conditions varies successively from 0 to 50%, as the number of plotting onto the graph, that is, resolution, increases without limitation, the graph will become more gradational and actually FIG. 10 presents a graph provided with shading. In FIG. 10, bold full lines respectively indicates relationships between the engine torque Te and the revolution N with the throttle opening degrees S of 10%, 20%, 30% and 40%.

Figure 11:
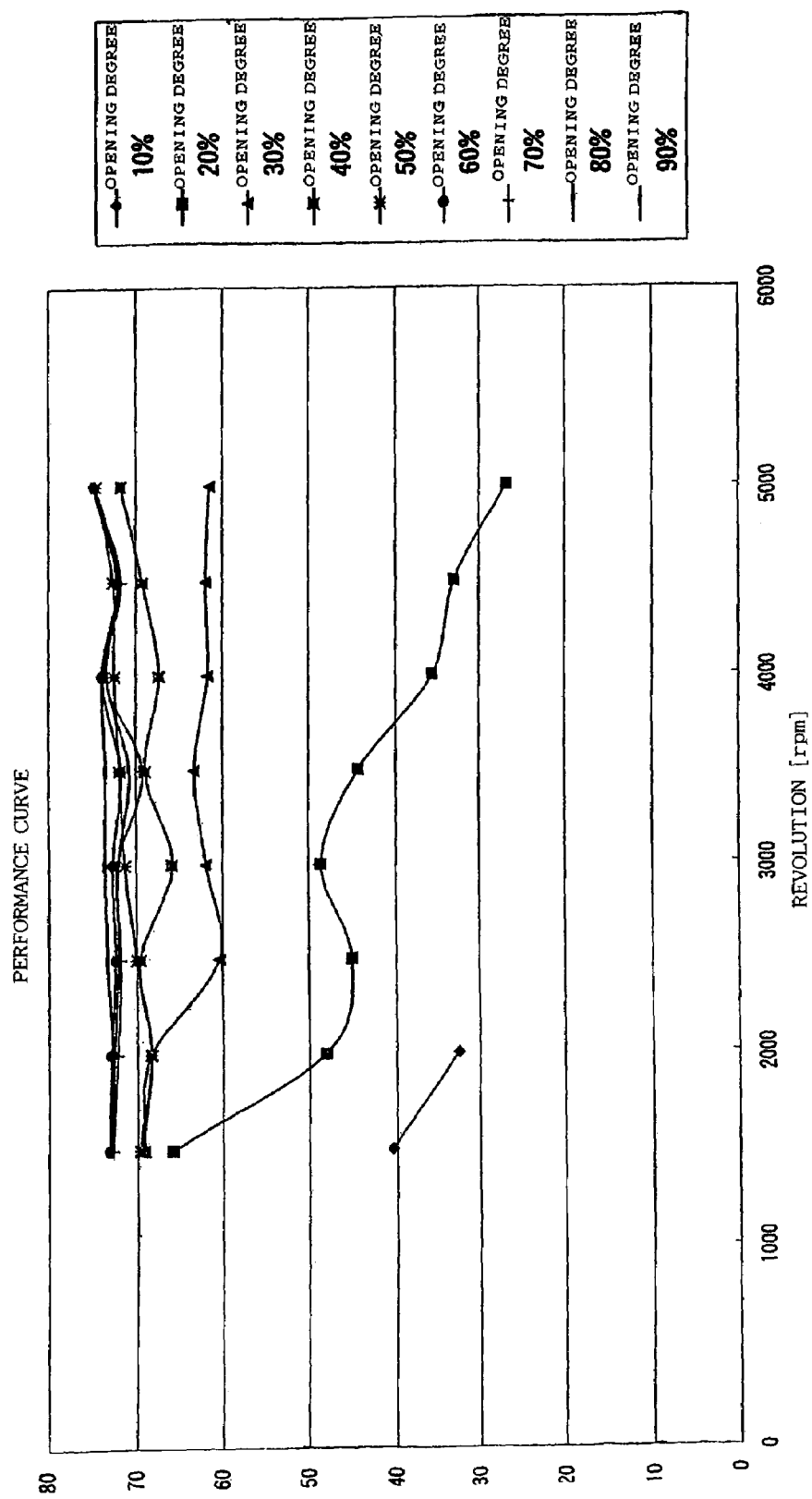
FIG. 11 is a graph showing relationship between the engine torque Te obtained by a conventional engine measuring equipment and the revolution N.

On the other hand, FIG. 11 graphs the characteristic relationship between the engine torque Te and the revolution N obtained not by the engine measuring equipment 1 of the present invention but by prior art engine measuring equipment. In the prior art measuring equipment, under a state with the throttle opening degree S being kept at a predetermined value (for example, 10%) and a static state with the revolution N stable at a constant value, that is, a state with the chronological variation $dN/dt$ of the revolution N having approached 0 unlimitedly, the revolution N and the related shaft torque Td are measured to plot the values of the revolution N and the related shaft torque Td for every throttle opening degree S so as to obtain the characteristics of relationship between the engine torque Td and the revolution N. Since it takes about several tens of seconds for the revolution N to get settled at a constant value, the test period required to acquire data necessary for the graph in FIG. 11 reaches several days.

Comparing the bold full line portions in FIG. 10 with the bold full line portions in FIG. 11, it is clarified that similar characteristic relationship between the engine torque Te and the revolution N on each throttle opening degree S. That is, according to the engine measuring equipment 1 of the present invention, not under a static state where the revolution N is stable at a constant value but under a transient state where the revolution N varies, tests are implemented so that in a short period of time (approximately 300 seconds in the present embodiment) and at a single round, the relationship between the engine torque Te and the revolution N will become obtainable. Moreover, the present embodiment varies the throttle opening degree S value as parameter successively so as to enable not only characteristics on discrete throttle opening degree S values as in conventional cases but also characteristics on various throttle opening degree S values will become available for knowledge. In a prior art static test, when measurement on engine torque characteristics every further successive throttle opening degree S is intended, more time period will be required.

Moreover, the present embodiment confirms whether or not the characteristic relationship between the engine torque Te and the revolution N provides effective and intensively reliable data to assess performance of the engine 10.

Figure 12:
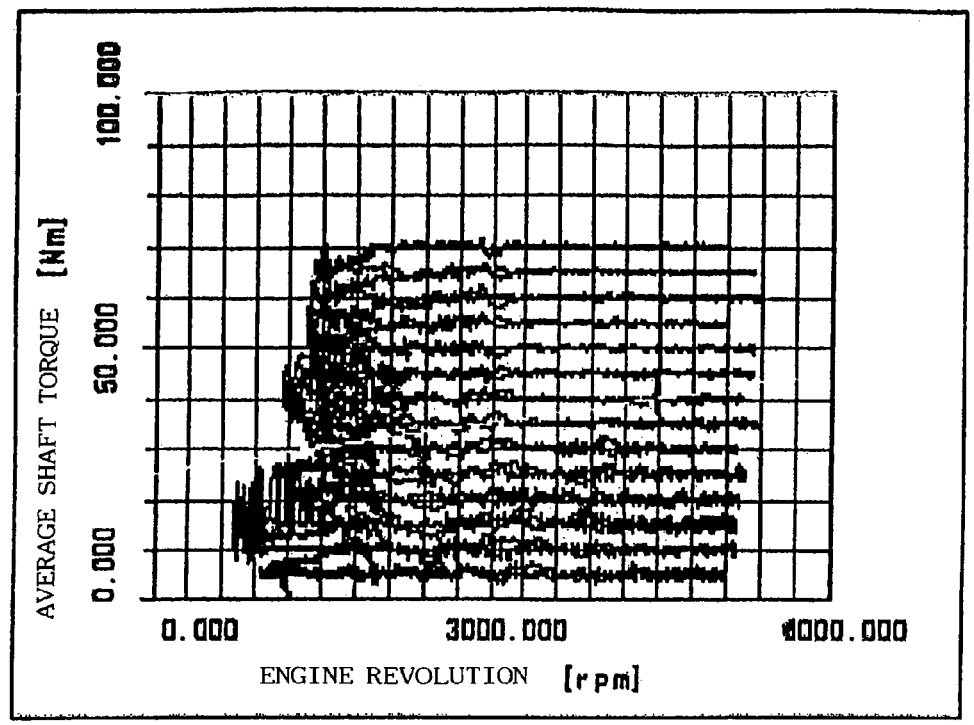
FIG. 12 is a graph tracing the average shaft torque Tdavg and a data set of revolution N at the same time as this.
Figure 13:
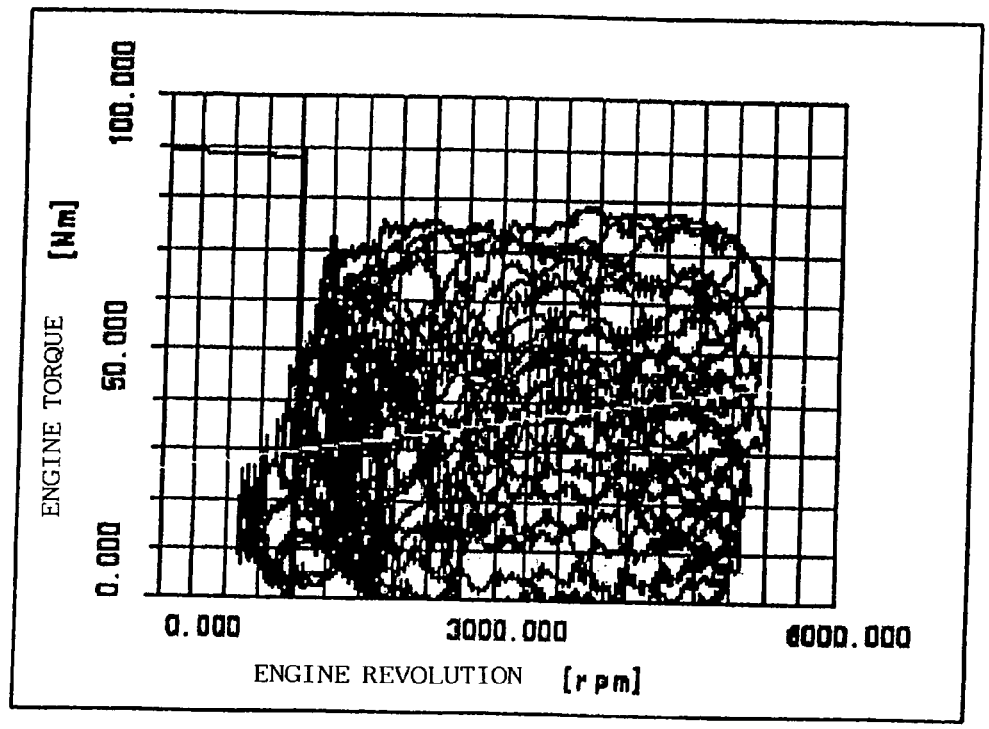
FIG. 13 is a graph tracing the engine torque Te and a data set of revolution N at the same time as this.

At first, the assessing portion 66 assesses whether the test conditions were valid or not (S140). In order to assess validity of the test conditions, it is assessed whether or not the data measured in the measuring portion 60 and the data calculated in the computing portion 64 exist within the range of characteristics expected to be obtainable from the test conditions, and are distributed appropriately without any bias. FIG. 12 is a graph tracing, among measurement data, the average shaft torque Tdavg and a data set of revolution N at the same time as this and FIG. 13 is a graph tracing the engine torque Te calculated in the computing portion 64 and a data set of revolution N at the same time as this. Hereafter, graphs used for assessing with the assessing portion 66, of course, can be displayed in the display portion 7.

FIG. 12 clarifies that for each average shaft torque Tdavg of 0 to 70 Nm the data of the revolution N are distributed without any bias but successively (without any lack) from 0 to 6000 rpm and moreover FIG. 13 clarifies that that distribution tendency will not vary even if the average shaft torque Tdavg is replaced with the engine torque Te. That is, from these findings, it can be stated that as test conditions the setting of the throttle opening degree S and the shaft torque Td is valid, enabling measurement of the revolution N under a transient state and the shaft torque Td varying under the transient state. In the case where setting of the test conditions is not valid (S150), the test conditions should be reviewed, etc. (S110) to execute tests again (S120).

In order to assess validity of test conditions more precisely, a frequency distribution table on a data set of the engine torque Te and the revolution N at the same time as this engine torque Te may be prepared to assess validity of test conditions based on judgment whether or not there exists any bias in frequency. For example, in the case where there exists extreme bias in frequency, the obtained characteristic relationship between the engine torque Te and the revolution N is not so reliable and therefore variable range of the shaft torque Td (amplitude), swing cycle, swing cycle of the throttle opening degree S, the flat period and the like should be reviewed.

In the case where the test conditions are assessed as valid (S150), the assessing portion 66 assesses reliability of the measurement data measured with the measuring portion 60 (S160). Assessment on reliability of the measurement data is implemented subject to preparation of a frequency distribution table on a data set of the engine torque Te calculated in the computing portion 64 and the revolution N at the same time as this engine torque Te and based on judgment whether or not there exists any bias in frequency.

Moreover, in this frequency distribution table, the computing portion 64 extracts from each data set the data set and the data of throttle opening degree S in the same day/time to obtain average values as well as standard deviation (deviation) of the throttle opening degrees at each distribution spot in the above described frequency distribution table. That is, here, the average value and the standard deviation of the throttle opening degree S in data set of any engine torque Te and the revolution N are obtained.

Thus, in all the data sets of the engine torque Te and the revolution N, if deviation of the throttle opening degree S values remains within a range of not more than 2 to 3%, the measurement data can be regarded highly reliable. However, in the case where there are a lot of throttle opening degrees S with deviation of throttle opening degree S being not less than 2 to 3%, the measurement data are not so reliable, and after reviewing the test environments such as removal of the causes of deviation in the measurement data, tests should be implemented again (S120).

In the case where the measurement data are assessed as highly reliable (S170), the assessing portion 66 assesses effectiveness of the correction data (S180). Assessment on effectiveness of the correction data will be implemented well by confirming how the relationship between the average shaft torque Tdavg being the original measurement data and the revolution N varies as a result of adding the correction data to the average shaft torque Tdavg.

Figure 14:
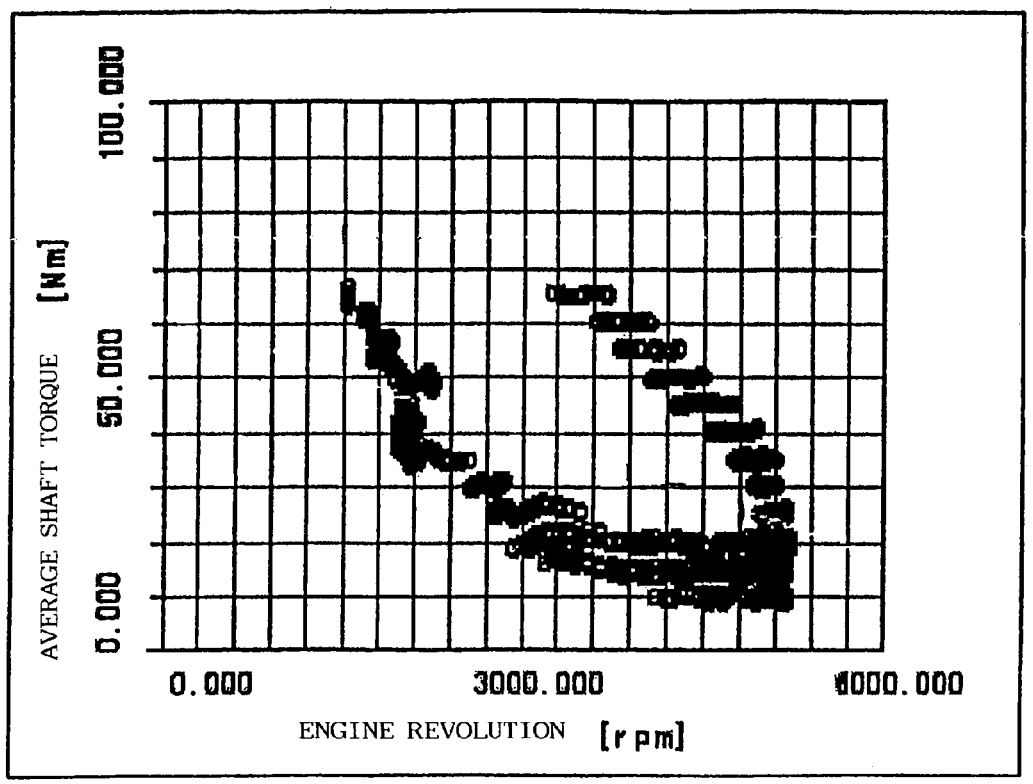
FIG. 14 is a graph showing the relationship between the average shaft torque Tdavg and the revolution N at the throttle opening degree S being 20%.
Figure 15:
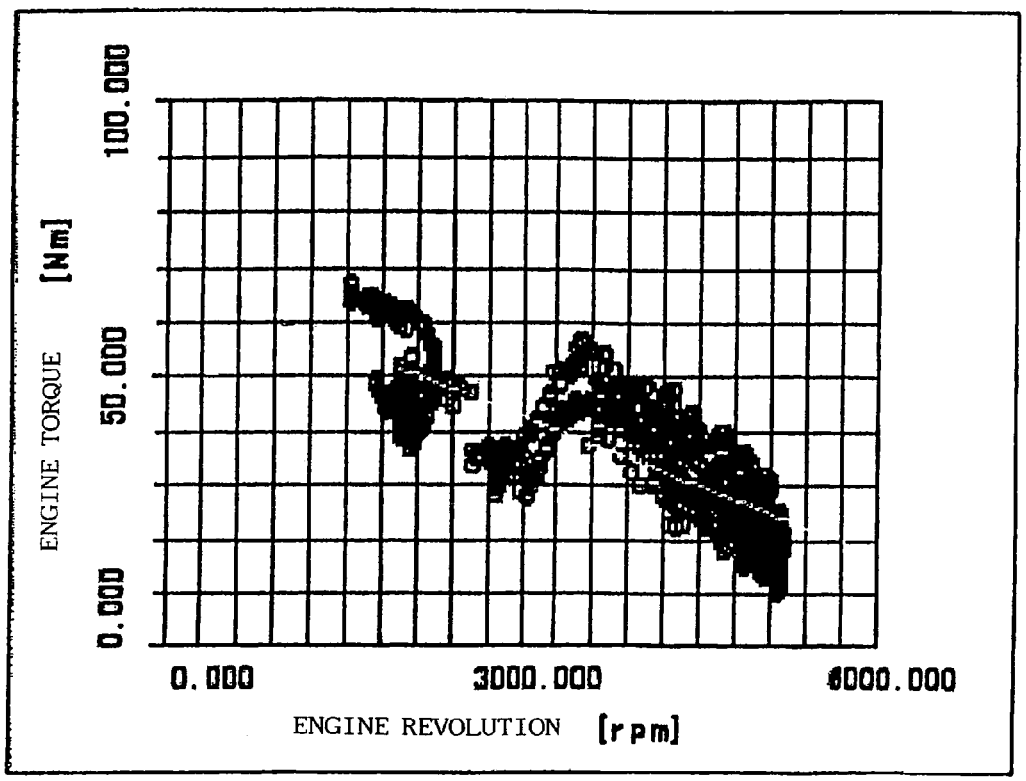
FIG. 15 is a graph showing the relationship between the engine torque Te and the revolution N at the throttle opening degree S being 20%.

Here, FIG. 14 graphs the relationship between the average shaft torque Tdavg and the revolution N at the throttle opening degree S being 20% and FIG. 15 graphs as in FIG. 14 the relationship between the engine torque Te with addition of the correction data to the average shaft torque Tadvg and the revolution N at the throttle opening degree S being 20%. In addition, for the relationship in each drawing, standard deviation graphs on throttle opening degree S, which are not shown, are preferably prepared.

The graph in FIG. 14 clarifies that the average shaft torque Tdavg prior to addition of correction data shows "binary nature" having two values for a single revolution N. The reason thereof is that the same revolution N results in difference in operation of the engine 10 according to increase or decrease in revolution N, giving rise to thereby difference in values such as torque and the like. This "binary nature" phenomenon is also clarified considering that, at the time when the standard deviation (not shown) of the throttle opening degree S for any average shaft torque Tdavg and the revolution N was obtained, any point showed large deviation as much as 2.5 to 5%.

However, in FIG. 15 the engine torque Te does not show any "binary nature", but the relationship between the engine torque Te and the revolution N is determined principally, and they are interrelated each other. That is, the correction data calculated in the computing portion 66 can be stated as effective. This is also clarified considering that, at the time when the standard deviation (not shown) of the throttle opening degree S for any average shaft torque Tdavg and the revolution N was obtained, deviation at any point remains within a range of not more than 2 to 3%.

The graph in FIG. 15, which resembles the curb of the throttle opening degree S being 20% among graphs obtained with prior art measuring equipment in FIG. 11, clarifies that the correction data calculated in the computing portion 66 are effective, and also from data measured at the time when the revolution N is under a transient state, the outcome equivalent to the graph obtained under a static state is obtainable.

In the case where the correction data are assessed as ineffective (S190), computing contents in the computing portion 64 and the defined value of inertia moment I should be reviewed, etc. to calculate again the correction data and the engine torque Te (S130).

The order of validity assessment on the test conditions in S140, reliability assessment on the measurement data in S160 and effectiveness assessment on the correction data in S180 will not be limited to the order implemented in the present embodiment, and those assessments may be implemented in an integrated and holistic fashion.

In addition, prior to calculation of the engine torque Te and the correction data in S130, only from the measurement data (average shaft torque Tdavg, the revolution N and the throttle opening degree S), the display portion 7 may be made to display graphs representing relationships among various data, frequency distribution tables, average value graphs and standard distribution graphs, etc. so as to assess validity of the test conditions and reliability of the measurement data in advance.

In addition, those three kinds of assessments need not always implemented in their entirety, but any of them may be omitted according to measurement environments and performance/measurement preciseness of the engine measuring equipment and the like.

In the case where the correction data are assessed as effective (S190), central control unit 5 selects data for display at a display portion 7 and makes the display portion 7 display them (S200). For example, the characteristic relationship between the engine torque Te and the revolution N with the throttle opening degree S as parameter, as shown in FIG. 10, is the most important graph to represent performance of the engine 10 straightforwardly. In the case where an engine bench for implementing performance assessment of the developed or manufactured engine 10 comprises the engine measuring equipment 1 of the present invention, the engine 10 is confirmed whether or not designed targets or predetermined standards are fulfilled, based on graphs displayed in the display portion 7, and in the case where the engine is judged not to achieve the targets or not to fulfill the standards, the engine 10 is reviewed.

The display portion 7 can display based on the measurement data and the data calculated in the computing portion 64, any relation graph, the standard deviation graph and the frequency distribution table. Of course, the display portion 7 can display all the graphs used so far for assessment in the assessing portion 66.

So far, embodiments of the engine measuring equipment has been described, and the engine measuring equipment of the present invention will not be limited to the engine measuring equipment comprising all the configuration requirements described in the aforementioned embodiments, but can be altered and modified variously. In addition, it goes without saying that such an alteration and modification belongs to the scope of claims of the present invention.

The embodiments have described an example for obtaining the characteristic relationship between the engine torque Te and the revolution N in a short period in the bench tests with the engine 10 being connected to the dynamometer 12, but the engine measuring equipment of the present invention can be also used in the case where air and fuel is supplied to the engine 10, and while the fuel is brought into combustion the revolution and the load torque is varied so as to measure/assess the engine performance.

In such a test, since, as parameter, the engine input side can obtain air injection quantity, fuel injection quantity, fuel-air ratio and ignition timing while the engine output side can obtain the exhaust gas components and the displacement volume in addition to the engine torque Te and the revolution N, the characteristic relationship between the engine torque Te and the revolution N obtained by the engine measuring equipment can be obtained on each of those parameters so as to be made use of for transmission control.

For example, obtaining the relationship between the engine torque Te and the revolution N with fuel efficiency (fuel flow to engine torque ratio) as parameter, an efficient transmission control method will become establishable based on this relationship. In addition, obtaining the relationship between the engine torque Te and the revolution N with the displacement volume as parameter, an efficient transmission control method will become establishable complying with recent exhaust gas regulation.

Instead of the engine measuring equipment for measuring engine performance with the dynamometer in bench tests, even with the engine measuring equipment used in in-vehicle tests among bench tests where mission, suspension and wheels are brought into connection in stead of the dynamometer, or actual running tests which are not bench tests, the engine torque Te can be obtained with the signal processing unit 6. In those cases, an assessing portion 66 executes validity assessment on the test conditions and/or reliability assessment on the measurement data and/or effectiveness assessment on the calculated correction data as well as engine torque Te so as to obtain data in which all the states of an engine with small torque to the maximum torque are averagedly distributed and thereby reliability of the engine torque Te calculated by the computing portion 64 can be secured.

ADVANTAGES OF THE INVENTION

According to such configured engine measuring equipment, engine torque is calculated with measurement data under a transient state (transient data) without waiting for the revolution N getting settled to a static state, so that, comparing with a conventional steady-state test, the time period to calculate engine torque is shortened by a large margin.

Moreover, characteristics of relationship between the engine torque and the revolution are displayed so that performance of an engine can be understood visually at a glance.

In addition, moreover, implementation of effectiveness or validity assessment on the test conditions, the measurement data, and correction data enhances reliability of engine performance data obtained with the engine measuring equipment of the present invention.

What is claimed is:

1. An engine measuring equipment for measuring engine performance in bench tests implemented with an engine and a dynamometer connected to the engine, the engine measuring equipment comprising:

a central control unit for controlling throttle opening degrees due to revolution of the engine and load torque of the dynamometer;

a detector connected to an output shaft of the engine, for detecting measurement data including at least revolution and shaft torque of the engine driven by controlling the central control unit; and a signal processing unit for measuring engine torque based on measurement data from the detector, wherein the central control unit implements such controlling that the revolution is lead to a transient state, and wherein the shaft torque varies during a period of the transient state; and wherein the signal processing unit calculates the engine torque based on time series data of the revolution and the shaft torque detected with the detector to measure engine torque from transient state data.

2. The engine measuring equipment according to claim 1, wherein the engine torque is calculated by performing computing process including time differentiation of the time series data of the revolution and/or shaft torque.

3. The engine measuring equipment according to claim 1 or 2, wherein the central control unit performs control operation so that the load torque is increased or decreased sequentially by each predetermined value while the throttle opening degrees changes for at least one cycle from the minimum value to the maximum value at each step of the predetermined value.

4. The engine measure equipment according to claim 1 or 2, further comprising a display unit for displaying characteristics of relationship between the engine torque and the revolution.

5. The engine measuring equipment according to claim 1 or 2, further comprising an assessing unit for implementing validity assessment on the test conditions and/or reliability assessment on the measurement data, and/or effectiveness assessment on the correction data and engine torque calculated on the basis of the measurement data.

* * * * *